United States Patent
Chiche et al.

(10) Patent No.: US 11,074,448 B2
(45) Date of Patent: Jul. 27, 2021

(54) METHOD FOR 3D MAPPING OF 2D POINT OF INTEREST

(71) Applicant: Schneider Electric Industries SAS, Rueil-Malmaison (FR)

(72) Inventors: Thierry Chiche, Saint Ismier (FR); Romain Gassion, Izeaux (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 0 days.

(21) Appl. No.: 15/725,793

(22) Filed: Oct. 5, 2017

(65) Prior Publication Data
US 2018/0101729 A1    Apr. 12, 2018

(30) Foreign Application Priority Data
Oct. 7, 2016  (EP) .................................... 16192817

(51) Int. Cl.
*G06K 9/00* (2006.01)
*G06T 19/00* (2011.01)
(Continued)

(52) U.S. Cl.
CPC ....... *G06K 9/00671* (2013.01); *G06F 16/583* (2019.01); *G06K 9/00208* (2013.01);
(Continued)

(58) Field of Classification Search
CPC .......... G06F 17/30247; G06K 9/00208; G06K 9/00671; G06K 9/3233; G06K 9/4671; G06K 9/00214; G06K 9/685; G06T 19/006; G06T 19/20; G06T 2200/04; G06T 3/40; G06T 17/00; G06T 19/00; G06T 2207/10012; G06T 2207/10028;
(Continued)

(56) References Cited

U.S. PATENT DOCUMENTS

2012/0026290 A1    2/2012  Lim et al.
2012/0310098 A1*  12/2012  Popovic ............. G01B 11/2513
                                                                  600/476
(Continued)

FOREIGN PATENT DOCUMENTS

WO    WO 2016/026437 A1    2/2016

OTHER PUBLICATIONS

European Search Report dated Apr. 18, 2017 in European Application 16192817.1, filed on Oct. 7, 2016 ( with Written Opinion).

*Primary Examiner* — Michael J Vanchy, Jr.
(74) *Attorney, Agent, or Firm* — Oblon, McClelland, Maier & Neustadt, L.L.P.

(57) ABSTRACT

A method for mapping 2-dimensional point of interest to a 3-dimensional view. The disclosed method includes capturing a 3-dimensional (3D) image with an augmented reality device. Matching images of a 2D image database with the captured 3D-image, the 2D image database containing 2-dimensional (2D) images associated with points of interest having a 2-dimensional (2D) data set. When the 2D-image matches the 3D image, capturing 3D-data for the matched 2D-image and converting the 2D-data set of the point-of-interest to a 3D-data set. The disclosed method simplifies the configuration of points of interest for 3D applications, such as an augmented reality device.

12 Claims, 7 Drawing Sheets

(51) Int. Cl.
  *G06F 17/30*    (2006.01)
  *G06K 9/32*     (2006.01)
  *G06T 3/40*     (2006.01)
  *G06F 16/583*   (2019.01)
  *G06T 19/20*    (2011.01)

(52) U.S. Cl.
  CPC .............. *G06K 9/3233* (2013.01); *G06T 3/40* (2013.01); *G06T 19/006* (2013.01); *G06T 19/20* (2013.01); *G06T 2200/04* (2013.01)

(58) Field of Classification Search
  CPC .. G06T 7/30; G06T 7/593; G06T 7/73; G06T 2207/10068; G06T 2207/30004; G06T 2207/30244; G06T 7/10; G06T 7/136; G06T 7/174; G06T 7/50; G06T 7/521; G06T 7/75; G01B 11/2513
  See application file for complete search history.

(56) References Cited

U.S. PATENT DOCUMENTS

| | | | |
|---|---|---|---|
| 2015/0071524 A1* | 3/2015 | Lee | G06K 9/00208 |
| | | | 382/154 |
| 2015/0091905 A1* | 4/2015 | Wang | G06T 19/00 |
| | | | 345/427 |
| 2016/0296291 A1 | 10/2016 | Chen et al. | |
| 2017/0337690 A1* | 11/2017 | Arth | G06T 7/136 |

\* cited by examiner

METHOD FOR 3D MAPPING OF 2D POINT OF INTEREST

The present invention relates to a method for 3D mapping of 2D Point of interest and an augmented reality device. In particular, the method relates to mapping a point of interest defined for a 2-Dimensional image in a 3-Dimensional image captured by an augmented reality device.

BACKGROUND

In mapping and navigation applications, points of interest are commonly applied to indicate where a particular object may be found. Such objects may be resources, such as gas stations, restaurants, or may be parts or components. A rough indication of the location where such objects are to be found is usually enough, but in certain conditions this may not be sufficient. In particular, in factory sites or other type of manufacturing plants, the precise location of components present in a machine, control cabinet or other industrial equipment, is required to prevent unintentional damage or even hazardous situations. The knowledge of where precisely to find and recognize parts in such circumstances, is of high importance. Prior art solutions include layout drawings and machine diagrams, pointing out the layout or structure of a particular machine. Enhanced versions thereof include actual pictures i.e. photo images of the particular machine or electrical control box. However, a configuration may be altered over time. For example, when parts are replaced or components are updated.

SUMMARY OF INVENTION

To address the above mentioned needs, operator and maintenance personnel may be instructed to re-take an image each time a particular machine, control cabinet or equipment is inspected or at least interacted with. Or, when new equipment is installed or equipment is updated, to take pictures of the newly installed configuration.

With these images Points of interest may be associated by assigning coordinates within the captured images. The operator may identify points-of-interest in the image at the moment of taking a picture, or it may also be performed by at a later stage. Or it may be performed by image-recognition software capable of identifying predefined components, equipment or other relevant parts that are of interest. Either way, these points of interest are defined in a 2D image that relate to a certain relevant part or piece of information. This allows creating a database of images having associated Points of interest that are defined in a 2-dimensional (2D) space. Hence, the captured image is treated as a 2D canvas i.e. surface space which may spanned by Cartesian coordinates or defined by any other suitable coordinate system.

It is an object of the invention to further alleviate the definition of points of interest for 3-dimensional applications.

According to one aspect, there is provided a method for mapping 2-dimensional point of interest to a 3-dimensional image. The method includes capturing a 3-dimensional (3D) with an augmented reality device. Matching images of a 2D image database with the 3D, the 2D image database containing 2-dimensional (2D) images associated with points of interest having a 2-dimensional (2D) data set. And when the 2D-image matches the 3D, capturing 3D-data for the matched 2D-image and converting the 2D-data set of the point-of-interest to a 3D-data set.

The disclosed method simplifies the configuration of Points of interest for 3D applications, such as an augmented reality device. As e.g. only X,Y coordinates need to be associated with a 2D image.

The invention further reduces the effort of defining Points of interest, as this may still be done in 2D images. Or may have been done previously, thus allowing the re-use of a prior created database with 2D images containing points of interest.

The invention further reduces the amount of data required to be stored as only 2D images and associated 3D absolute position coordinates are to be stored, and not full 3D images and associated content.

In this application, any 3D image has a 3D representation consisting of a 2D image i.e. 2D frame with associated depth information for a number of points or all points in the 2D frame.

BRIEF DESCRIPTION OF THE DRAWINGS

By way of example only, the embodiments of the present disclosure will be described with reference to the accompanying drawing, wherein.

DETAILED DESCRIPTION

Figure 1:
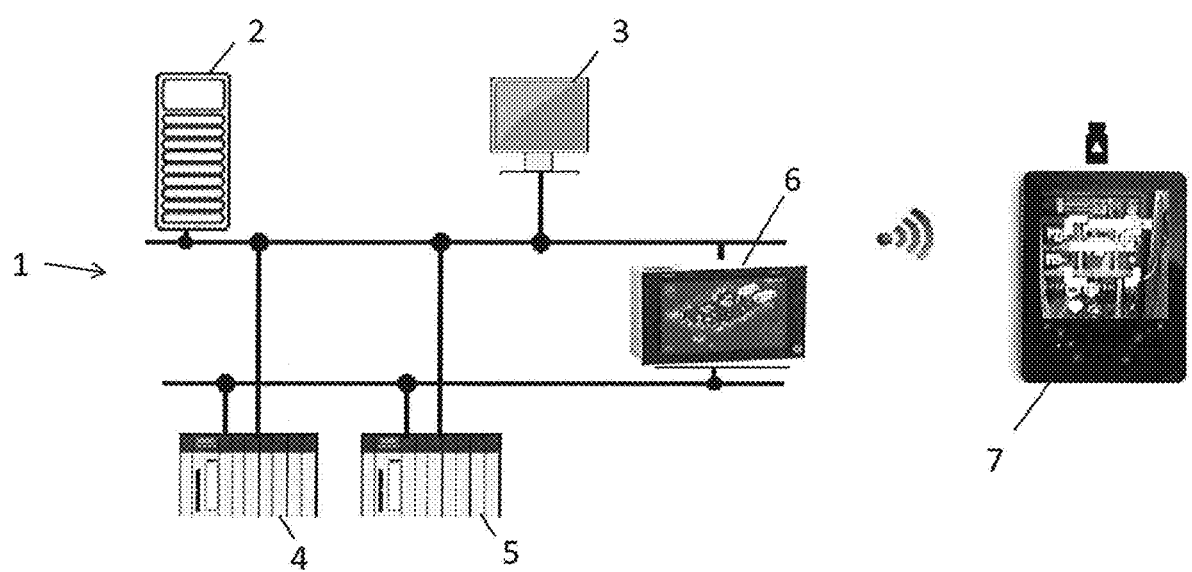
FIG. 1 illustrates schematically an example of an augmented reality system in an industrial control system.

Referring to FIG. 1, various components typically making up an industrial control system 1 are shown. There are an automation server 2, a SCADA station 3, and cabinets 4, 5 with Programmable Logic Controllers and other equipment. Also shown is an augmented reality image server 6 and an augmented reality device 7, which make up an augmented reality system in an industrial control environment. An operator may use the device 7 to assist when inspecting equipment in the cabinets 4, 5 by placing the device 7 in front of the object under inspection. The device 7 is intended to capture an image of the equipment, recognize the equipment in the image, communicate with the image server 6, and show additional information regarding the equipment recognized. In this manner, an augmented reality may be obtained, as any information relating to the equipment may be retrieved and shown as an overlay in the image shown on the display of the device 7.

Figure 2:
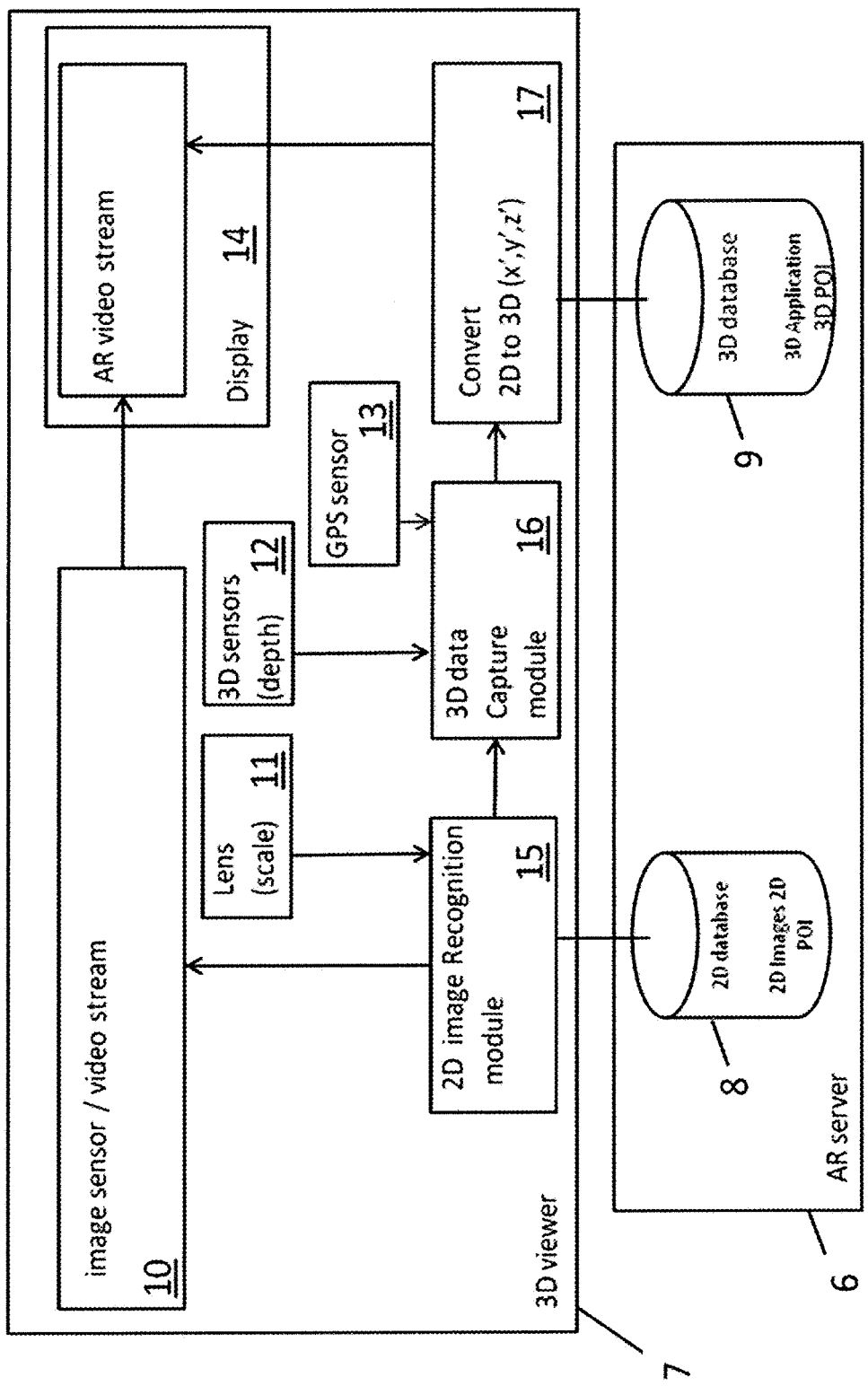
FIG. 2 illustrates schematically an example of an augmented reality system in accordance with the invention.

In FIG. 2, the augmented reality device 7 and augmented reality image server 6 of the augmented reality system are shown schematically in more detail. The augmented reality image server 6 has a 2D database 8 containing 2-dimensional images with points of interest having 2-dimensional (2D) data sets, and a 3D database 9 containing 3-dimensional images with points of interest having 3-dimensional (3D) data sets.

The augmented reality i.e. 3D device 7 has an image sensor 10, an adjustable lens 11, and 3D-sensors 12 which are able to determine a depth i.e. distance between the 3D device and a visible object. The 3D device further has an absolute positioning sensor 13, a GPS sensor in this example, and a display 14. Further shown in FIG. 2 are a 2D image recognition module 15, a 3D data capture module 16, and 2D to 3D converter module 17. In this example, these are shown as separate hardware modules being part of the 3D device 7. In another example, these modules may be implemented as software modules executed by a general processing unit. In yet another example, these modules may be part of the augmented reality image server 6 or located on a separate server as part of an augmented reality system.

In this example the absolute position sensor is a GPS sensor, but other navigational sensors capable to determine the position of the device in relation to a reference point are also suited, such as e.g. the EU Galileo positioning system or China's BeiDou Navigation Satellite System. Other position sensors that allow to obtain an absolute position within a geographical space are also suited, such as position sensor and system that allows to define a fixed known reference point and determine the device position relative to that defined reference position.

Figure 3:
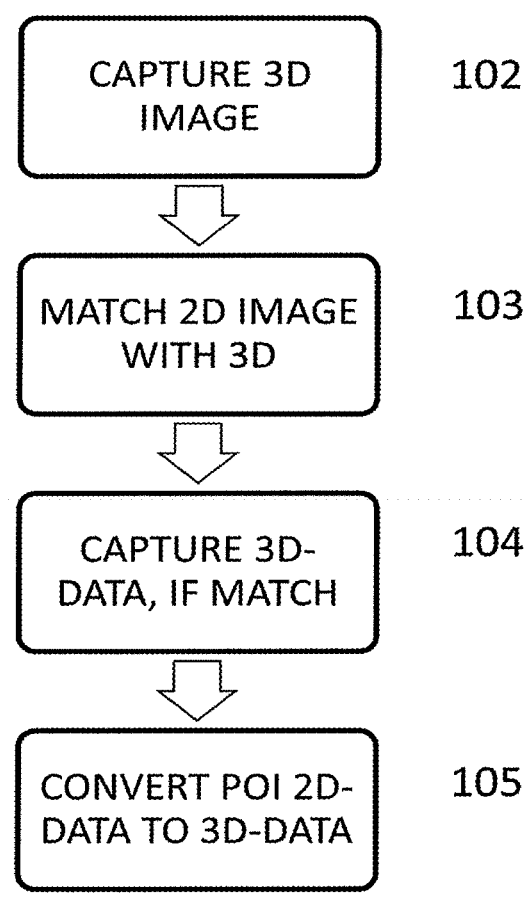
FIG. 3 illustrates an example of a method in accordance with the invention.

Referring to FIG. 3, a method for mapping a 2-dimensional point of interest in a 3-dimensional view is shown. The method may be implemented by the augmented reality system examples described with reference to FIG. 2. The method starts with capturing 102 a 3-dimensional (3D) image with an augmented reality device. Followed by matching 103 images of a 2D image database with the captured 3D-image. This 2D image database contains 2-dimensional (2D) images associated with points of interest having a 2-dimensional (2D) data set. When the 2D-image matches the 3D image, the method continues by capturing 3D-data 104 for the matched 2D-image and converting 105 the 2D-data set of the point-of-interest to a 3D-data set. The obtained 3D data set will store the points of interest with global position coordinates, such as e.g. GPS-coordinates, which will allow easy retrieval of points of interest based on the global position of the augmented reality device.

The above steps may be regarded as a learning phase wherein the 3D data base on the AR-server is populated with 3D data sets of the points of interest available for later retrieval. In this manner, 2D image recognition of one image is only required once, as the 3D data set of each point of interest will be stored with global position coordinates.

Figure 4:
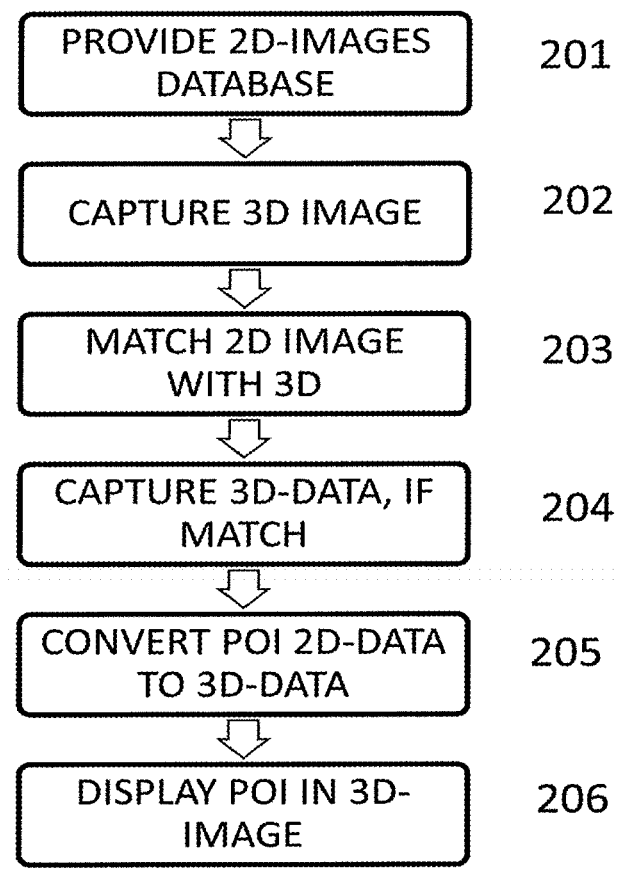
FIG. 4 illustrates another example of a method in accordance with the invention.

Turning to FIG. 4, an example of a method for displaying a 2-dimensional point of interest in a 3-dimensional view is shown. The method may also be implemented by the augmented reality system examples described with reference to FIG. 2. This method includes, similarly to the method as described in reference to FIG. 3, capturing 202 the 3D image, followed by matching 203 images of the 2D image database with the captured 3D-image and, when the 2D-image matches the 3D image, continues by capturing 204 3D-data and converting 205 the 2D-data set of the point-of-interest to a 3D-data set. In addition to the above, the method includes providing 201 a 2D image database containing 2-dimensional (2D) images associated with points of interest having a 2-dimensional (2D) data set; and displaying 206 the point of interest in the 3D view as augmented reality. The 3D view may be shown on the display of the augmented reality device, e.g. when an operator is performing inspection or maintenance tasks. The 3D view may also be shown on a display of a work station in a remote control room.

One advantage of the above described methods is that this allows points of interest to be defined in 2D images in a very simple manner, while in the learning phase all points of interest may be instantiated in a 3D-image for the application by means of the 2D recognition.

Figure 5:
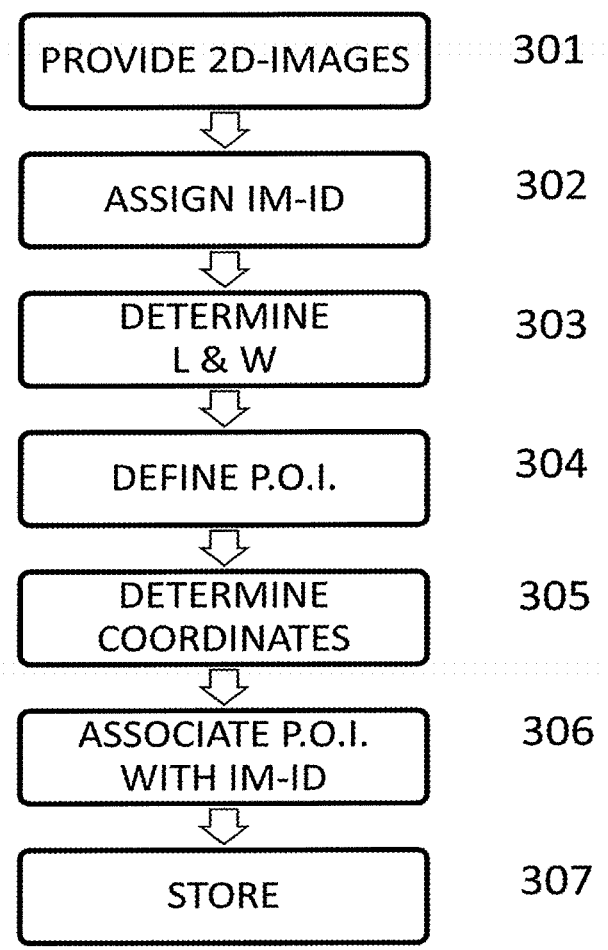
FIG. 5 illustrates an example of a method for creating a 2D image database.

Referring to FIG. 5, a method for creating a 2D image database storing 2-dimensional (2D) images associated with points of interest is shown. In order to create such a 2D image database a 2D design tool is used to process images that were previously taken e.g. by an operator or otherwise provided 301. In the 2D images points of interest are to be defined which may for example refer to certain switches, circuit breakers, I/O connections or other components.

Thereto each image is assigned 302 an image identifier ID-im as a unique means for referring to the image. Further properties as length L and width W of the image are determined 303, as is a reference point. The reference point may be one of corners of the image, it may be the centre of the image, or it may be any other reference point suitable to be taken as an origin for a coordinate system, such as the origin of a Cartesian system. In the latter case, with the origin on one corner, maximum values for X and Y will be equal to L and W.

With the 2D image being processed, a point of interest having a respective poi-identifier ID-poi may be defined 304 within the image. Along with the defining of the point of the interest and its poi-identifier, first coordinates of the point of interest in relation to the reference point, i.e., origin, of the image are determined 305; for example, X-poi and Y-poi, for which purpose the 2D image may be regarded as a Cartesian coordinate space R. The above may be repeated for multiple points, as one 2D image may show multiple points of interest. In this manner, each point of interest has a 2-dimensional (2D) data set that at least contains the coordinates of the poi in the 2D image. Such a data set may for example take the form for each P.o.I. as (ID-poi, X-poi, Y-poi, ID-im).

Creating the 2D image database further requires associating 306 each defined point of interest with the image identifier. This may be done by creating a record for each image identifier and storing all poi-identifiers of the respective points of interest associated with the image and its image identifier. It may also be done by creating a record for each poi-identifier and storing the image identifier associated therewith.

All the above is stored 307 in the 2D image database, so the image identifier, the length and width of the image, the reference point in the image, the poi-identifier, the coordinates of the at least one point of interest, and the association with each defined point of interest. Accordingly, a 2D image database is provided containing 2-dimensional (2D) images associated with points of interest having a 2-dimensional (2D) data set.

Returning to FIGS. 2 and 3, the method will be described in further detail. In order to capture the 3D-image, a 3D representation is obtained of the captured 3D image via 3D-sensors and the image sensor of the augmented reality device. This 3D representation includes a 2D frame, which in this example is a 2D-image captured by the image sensor, consisting of points defined by two dimensional frame coordinates, for example values for X and Y in a Cartesian coordinate system. Each point in the 2D frame is associated with a depth, similar to the Cartesian coordinate Z, which is obtained by the 3D-sensors. The 2D frame could also be constructed as a vector field with a vector Z defined for each point (X, Y). The 2D frame does not necessarily need to be continuous, for example it may also be of a discrete form.

For example, the 3D device may use laser to apply a matrix projection to determine the deformation caused by objects in front of it. Such a projection will only obtain values for Z i.e. depth for a limited number of points depending on the mesh size or pitch of the matrix projection. In yet another way, the 2D frame may be construed as a projection of the 3D-image along the Z-axis onto the X-Y plane.

The matching of images of the 2D image database with the 3D-image includes comparing each 2D image of the 2D image database with the 2D frame of the 3D representation by scaling and translating the 2D image over the 2D frame. An example of the required processing movements is shown in a simplified manner in FIG. 6.

When the 2D image matches the 3D image, so in the above example the 2D frame of the 3D representation, the 3D data for the corresponding match needs to be captured. This capturing of 3D data for the matched 2D image includes determining frame coordinates of the reference point of the 2D image in the 2D frame of the 3D representation. The capturing further includes determining scale information, and obtaining a distance D between the augmented reality device and the 2D image; both of which may be obtained from the lens of the 3D device. One common way of performing scaling is a homothetic projection, which allows resizing of a shape while maintaining its ratio aspects and with minimal deformation.

The frame coordinates, scale information, distance D and image identifier of the matched image may be stored in a matched image object as an intermediate result.

With the 3D-data captured, the 2D-data set of the point-of-interest can be converted to a 3D-data set. This converting of the 2D-data set to the 3D-data set includes applying the scaling information to the first coordinates of the point of interest. The converting further includes applying the frame coordinates of the reference point to the coordinates of the point of interest to obtain frame coordinates of the point of interest. And finally, to obtain a depth coordinate for the point of the interest, the depth associated with frame coordinates of the point of interest and the scaling information is processed to calculate the depth coordinate. In this manner, a set of 3-dimensional coordinates of the point of interest is obtained, defined in the coordinate system of the augmented reality device R'.

These frame coordinates may be converted to global position coordinates, such as e.g; known as GPS. Thereto, a global position of the augmented reality device is obtained. From this a global position of the point of interest is obtained by applying the global position of the augmented reality device to the frame and depth coordinates of the point of interest. These 3D data may then be stored as the global position of the point of interest in the 3D data set.

Figure 6:
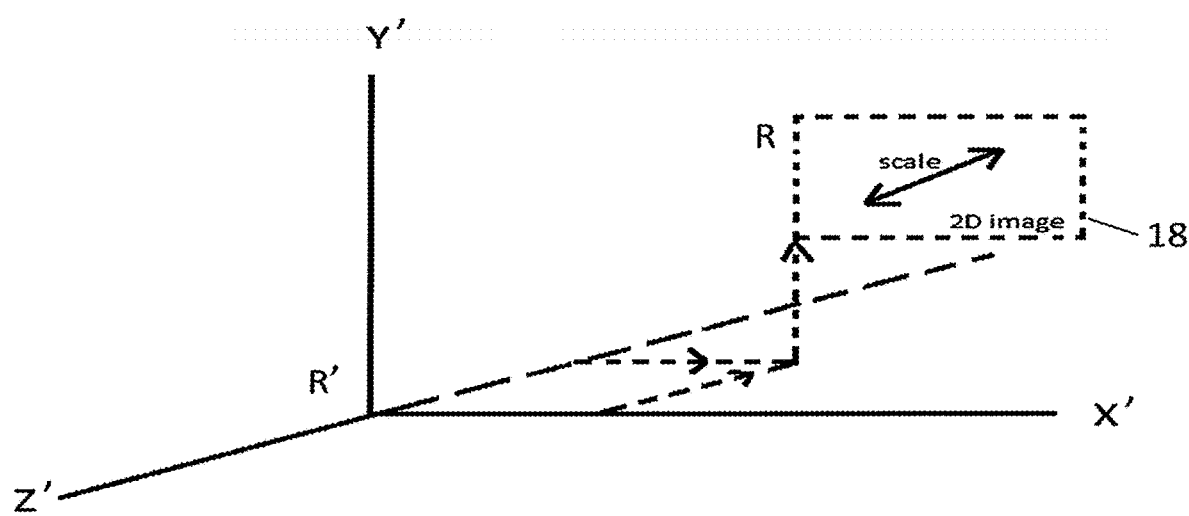
FIG. 6 illustrates schematically a matching of a 2-dimesnional image in a 3-dimensional coordinate system.

FIG. 6 shows the relation of the coordinate space R of the 2D image 18 and a possible coordinate space R' of the augmented reality device. In another example, instead of Cartesian coordinates, the device coordinate space could also be defined by spherical coordinates.

Figure 7:
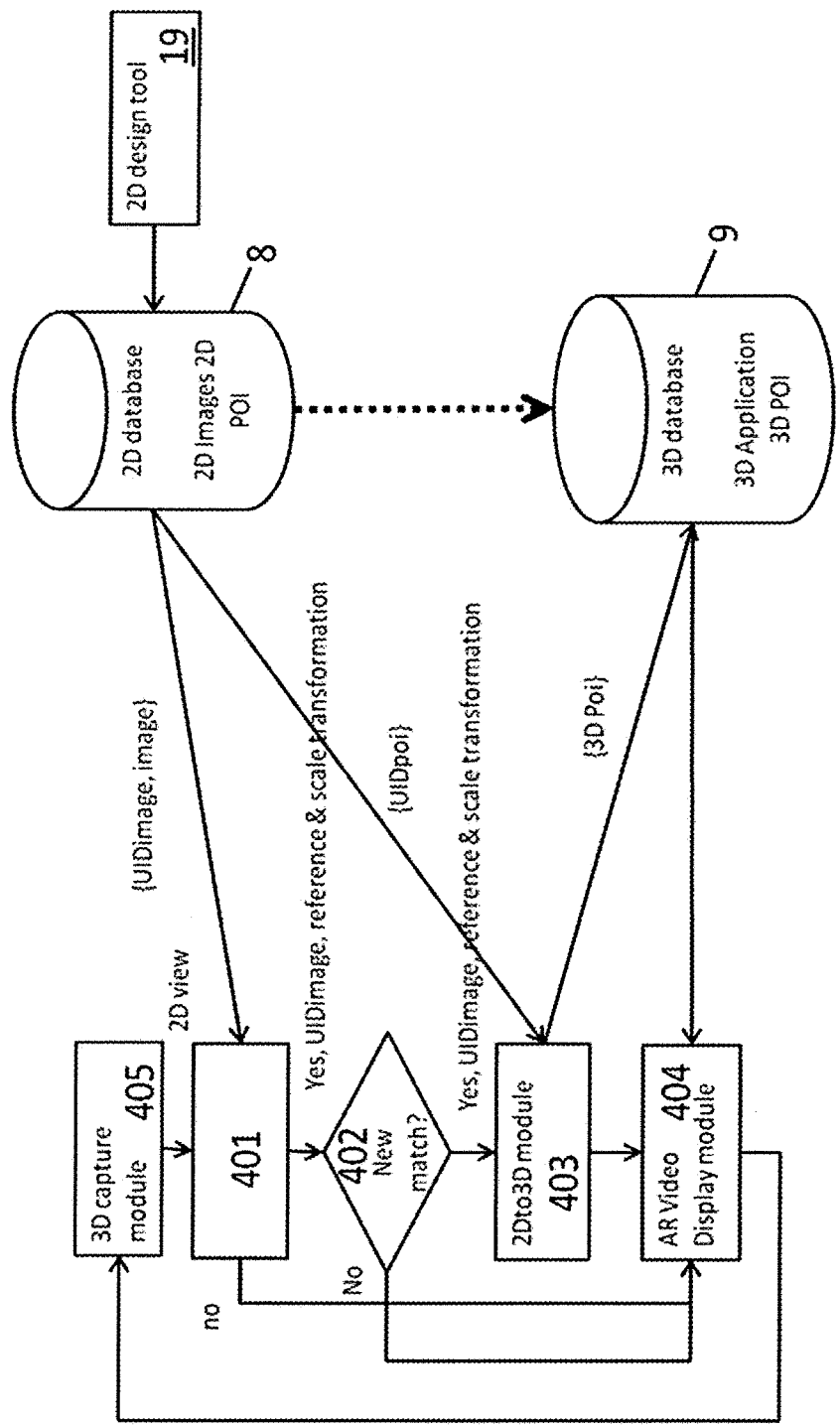
FIG. 7 shows a flow diagram illustrating a method in accordance with the invention.

Referring to FIG. 7, a flow chart is shown illustrating a further example of a method in accordance with the invention. The 2D design tool 19 is used to define point-of-interests for 2D images. The 2D design tool 19 delivers these 2D images to the 2D image database 8 in which they are stored, together with an image identifier ID-im, the length L, the width W. In addition, the points-of-interests are stored together with, for each point-of-interest, a poi-identifier ID-poi, the X coordinate of the p.o.i. in the 2D image X-poi, the Y coordinate of the p.o.i. in the 2D image Y-poi, and the image identifier ID-im for which they were defined and hence are associated. The 3D image is captured 405 with X, Y, Z coordinates for each point of the image.

The 2D images are processed one by one by the 2D recognition tool to be matched 401 with captured 3D image. When matched a match-image object is created containing the image identifier ID-im, updated coordinates X' and Y' defining the coordinates of the origin in the captures 3D image, and scale-information defining the scale of the 2D image in the captured 3D image. As the captured 3D image may show multiple points-of-interest, the 3D image is compared with further 2D images of the 2D image database; if further matches are obtained these are also stored in the match-image object. Therefore, in case of a match it is checked whether this is a new match 402 or not. As the location of the 3D device may be known the number of 2D images relevant to be compared may be limited based on the location.

When the 2D image is matched to the 3D image the 2D data X-poi, Y-poi are converted 403 by the 2D to 3D module to one 3D data set which is stored in the 3D database 9. The conversion is performed by processing the match-image objects for each 2D image associated with the 3D image. The 2D image matching may by itself also contain multiple points-of-interest, in which case the converting of the 2D data set is applied to all points-of-interest defined for that image. All the converted 3D data sets are stored in the 3D database 9.

When a 2D image was previously matched to 3D image, the converting may be skipped as prior converted 3D data set will be available. Hence, only when a new matched image is obtained the converting of the 2D to 3D data set will be performed.

Once the 3D data set is obtained, the 3D image will be shown on the display of the 3D device together with all identified points-of-interest.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for mapping a 2-dimensional (2D) point of interest in a 3-dimensional (3D) view, comprising:
   in a learning phase, capturing 3D images that match 2D images previously stored in a 2D image database and associating the 3D images with the 2D images in the 2D image database;
   outside of the learning phase:
   capturing a 3D image with an augmented reality device, the captured 3D image comprising a 2D image captured by an image sensor and associated depth information captured by a laser 3D sensor based on a matrix of points corresponding to the captured 2D image, the captured 2D image and associated depth information being a 2D frame constructed as a vector field with a vector corresponding to depth associated with each point in the 2D image;

matching the 2D images of the 2D image database with the captured 3D image based on the 3D images associated with the 2D images in the 2D image database, the 2D image database comprising 2D images associated with points of interest having a 2D data set, wherein when a 2D image of the 2D image database matches the captured 3D image:

capturing 3D data for the matched 2D image, and converting the 2D data set to a 3D data set, wherein the captured 3D image and the images in the 2D data base are in spherical coordinates.

2. The method according to claim 1, wherein the 2D image database is created by:

providing the 2D images; and for each image of the 2D images:

assigning an image identifier, determining length and width of the image, defining at least one point of interest having a respective poi-identifier, determining first coordinates of the at least one point of interest in relation to a reference point of said each image, associating each defined at least one point of interest with the image identifier, and storing the image identifier, the length and width, the reference point, the poi-identifier, the first coordinates of the at least one point of interest, and the association with said each defined at least one point of interest.

3. The method according to claim 1, wherein capturing the 3D image comprises obtaining a 3D representation of the captured 3D image via 3D sensors of the augmented reality device, wherein the 3D representation comprises a 2D frame consisting of points defined by 2D frame coordinates, and wherein each point of said points is associated with a depth.

4. The method according to claim 1, wherein the matching images of the 2D image database with the captured 3D image comprises comparing each 2D image of the 2D image database with a 2D frame of the 3D representation by scaling and translating said each 2D image over the 2D frame.

5. The method according to claim 1, wherein the capturing 3D data for the matched 2D image comprises:

determining frame coordinates of a reference point of the matched 2D image in a 2D frame;

determining scale information from a size of the 2D image and a size of the 2D frame; and obtaining a distance between the augmented reality device and the 2D image.

6. The method according to claim 1, wherein converting the 2D data set to the 3D data set comprises:

applying scaling information to first coordinates of the points of interest; and applying frame coordinates of a reference point to the first coordinates of the points of interest to obtain frame coordinates of the points of interest.

7. The method according to claim 6, wherein converting the 2D data set to the 3D data set further comprises determining a depth coordinate for the points of interest from:

a depth associated with the obtained frame coordinates of the points of interest; and the scaling information.

8. The method according to claim 7, wherein converting the 2D data set to the 3D data set further comprises:

obtaining an absolute position of the augmented reality device;

determining an absolute position of the points of interest by applying a global position of the augmented reality device to the frame coordinates and the depth coordinates of the points of interest; and storing the absolute position of the points of interest in the 3D data set.

9. A method for displaying a 2-dimensional (2D) point of interest in a 3-dimensional (3D) view, comprising:

providing a 3D image database comprising points of interest having a 3D data set obtained by the method according to claim 1; and displaying the points of interest in the 3D view as augmented reality.

10. An augmented reality device for capturing a 3-dimensional (3D) image, comprising:

an adjustable lens;

an image sensor;

laser 3D sensors;

an absolute positioning sensor;

a display; and a processing unit configured to:

in a learning phase, capture 3D images that match 2D images previously stored in a 2D image database and associate the 3D images with the 2D images in the 2D image database;

outside of the learning phase:

match a 2D image from the 2D image database with a 3D image captured by the image sensor based on the 3D images associated with the 2D images in the 2D image database, the 2D image database comprising 2D images associated with points of interest having a 2D data set, the captured 3D image comprising a 2D image captured by the image sensor and associated depth information captured by the laser 3D sensors based on a matrix of points corresponding to the captured 2D image, the captured 2D image and associated depth information being a 2D frame constructed as a vector field with a vector corresponding to depth associated with each point in the 2D image, capture 3D data of the captured 3D image from the 3D sensors and the adjustable lens when the 2D image from the 2D database matches the captured 3D image, convert the 2D data set to a 3D data set, and display the points of interest on the display in a 3D view as augmented reality, wherein the captured 3D image and the images in the 2D data base are in spherical coordinates.

11. A system for providing an augmented reality, comprising:

an augmented reality device according to claim 10; and an augmented reality image server comprising:

a 2-dimensional (2D) database comprising images with points of interest having 2D data sets, and a 3-dimensional (3D) database comprising images with points of interest having 3D data sets.

12. An augmented reality device for capturing a 3-dimensional (3D) image, comprising:

an adjustable lens;

an image sensor;

laser 3D sensors;

an absolute positioning sensor; and a display;

a 2-dimensional (2D) database comprising 2D images with points of interest having 2D data sets;

a 3D database configured to store 3D images with points of interest having 3D data sets; and a processing unit configured to:
  in a learning phase, associate the 3D images in the 3D database with the 2D images in the 2D image database;
  outside of the learning phase:
  match a 2D image from the 2D database with a 3D image captured by the image sensor based on the 3D images associated with the 2D images in the 2D image database, the captured 3D image comprising a 2D image captured by the image sensor and associated depth information captured by the laser 3D sensors based on a matrix of points corresponding to the captured 2D image, the captured 2D image and associated depth information being a 2D frame constructed as a vector field with a vector corresponding to depth associated with each point in the 2D image,
  capture 3D data of the captured 3D image from the 3D sensors and the adjustable lens when the 2D image from the 2D database matches the captured 3D image,
  convert the 2D data set to a 3D data set, and
  display the points of interest on the display in a 3D view as augmented reality,
wherein the captured 3D image and the images in the 2D data base are in spherical coordinates.

* * * * *